(12) United States Patent
Yu et al.

(10) Patent No.: US 10,657,355 B2
(45) Date of Patent: *May 19, 2020

(54) ELECTRONIC APPARATUS AND FINGERPRINT MODULE THEREOF

(71) Applicant: GUANGDONG OPPO MOBILE TELECOMMUNICATIONS CORP., LTD., Dongguan, Guangdong (CN)

(72) Inventors: Weibin Yu, Guangdong (CN); Maozhao Huang, Guangdong (CN); Mao Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,594

(22) Filed: Nov. 28, 2018

(65) Prior Publication Data

US 2019/0095684 A1 Mar. 28, 2019

Related U.S. Application Data

(63) Continuation of application No. PCT/CN2017/088769, filed on Jun. 16, 2017.

(30) Foreign Application Priority Data

Aug. 16, 2016 (CN) .......................... 2016 1 0678006
Aug. 16, 2016 (CN) ..................... 2016 2 0890788 U

(51) Int. Cl.
*G06K 9/00* (2006.01)
*H04M 1/02* (2006.01)
(Continued)

(52) U.S. Cl.
CPC ....... *G06K 9/00053* (2013.01); *G06F 1/1626* (2013.01); *G06F 1/1684* (2013.01); *H04M 1/026* (2013.01)

(58) Field of Classification Search
CPC . G06K 9/00053; G06F 1/1684; G06F 1/1626; H04M 1/026
See application file for complete search history.

(56) References Cited

U.S. PATENT DOCUMENTS

2008/0267462 A1 10/2008 Nelson et al.
2011/0162879 A1 7/2011 Bunyan et al.
(Continued)

FOREIGN PATENT DOCUMENTS

CN 101382994 A 3/2009
CN 105373778 A 3/2016
(Continued)

OTHER PUBLICATIONS

European search report, EP17840846, dated Jun. 4, 2019.
(Continued)

*Primary Examiner* — Bobbak Safaipour

(57) ABSTRACT

A fingerprint module and an electronic apparatus are described. The fingerprint module may include: an encapsulation layer and a decoration component. The encapsulation layer may be configured to encapsulate a fingerprint identifying assembly and include a rear wall having a first mating portion. The decoration component may define an embedded groove and include a second mating portion in the embedded groove. The encapsulation layer may be embedded in the embedded groove, and the first mating portion may be embedded to the second mating portion.

19 Claims, 3 Drawing Sheets

(51) Int. Cl.
*G06F 1/16* (2006.01)
*G06K 9/20* (2006.01)

(56) References Cited

U.S. PATENT DOCUMENTS

| | | | |
|---|---|---|---|
| 2014/0126127 A1 | 5/2014 | Yeh | |
| 2015/0014141 A1 | 1/2015 | Rao et al. | |
| 2015/0189204 A1 | 7/2015 | Oganesian et al. | |
| 2015/0277503 A1* | 10/2015 | Eremenko | G06F 1/1658 361/679.4 |
| 2018/0034948 A1* | 2/2018 | Yu | H04M 1/0283 |
| 2018/0198089 A1* | 7/2018 | Kim | H01L 51/5284 |
| 2019/0294856 A1* | 9/2019 | Yu | G06F 1/1684 |
| 2019/0294857 A1* | 9/2019 | Yu | G06K 9/00053 |

FOREIGN PATENT DOCUMENTS

| | | |
|---|---|---|
| CN | 105404881 A | 3/2016 |
| CN | 105512652 A | 4/2016 |
| CN | 205318405 U | 6/2016 |
| CN | 205375368 U | 7/2016 |
| CN | 106203403 A | 12/2016 |
| CN | 106203404 A | 12/2016 |
| CN | 206178866 U | 5/2017 |
| CN | 206178867 U | 5/2017 |
| CN | 105825165 A | 8/2018 |
| EP | 3399383 A1 | 11/2018 |

OTHER PUBLICATIONS

First Chinese Office Action dated Jul. 3, 2017; Appln No. 201610678006.3.
Second Chinese Office Action dated Sep. 25, 2017; Appln. No. 201610678006.3.
International Search Report dated Sep. 18, 2017; PCT/CN2017/088769.
Chinese First office action and Written Opinion for related application No. 201610677965.3, dated Jul. 12, 2017 (7 pages).
U.S. Non Final Action and Written Opinion for related application No. 16439589, dated Jun. 12, 2019 (18 pages).
International Search Report and Written Opinion for related International application No. PCT/CN2017/088948, dated Aug. 24, 2017 (2 pages).
European Search Report and Written Opinion for related European application No. EP17840847, dated May 23, 2019 (8 pages).

* cited by examiner

ELECTRONIC APPARATUS AND FINGERPRINT MODULE THEREOF

CROSS-REFERENCE TO RELATED APPLICATIONS

The present application is a continuation-application of International (PCT) Patent Application No. PCT/CN2017/088769 field on Jun. 16, 2017, which claims foreign priority of Chinese Patent Application No. 201610678006.3, filed on Aug. 16, 2016, and Chinese Patent Application No. 201620890788.2, filed on Aug. 16, 2016 in the State Intellectual Property Office of China, the entire contents of which are hereby incorporated by reference.

TECHNICAL FIELD

The described embodiments relate to electronic device, and in particular to an electronic apparatus and fingerprint module of the electronic apparatus.

BACKGROUND

Electronic apparatuses, such as mobile phones, are required to be thinner. However, if the thickness of each component in the fingerprint module of the electronic apparatus cannot be reduced, the thickness of electronic apparatus is difficult to reduce.

BRIEF DESCRIPTION OF THE DRAWINGS

In order to illustrate the technical solution in the embodiments of the present disclosure more clearly, the accompanying drawings to be used in the description of the embodiments are briefly described below. It will be apparent that the accompanying drawings in the following description are merely embodiments of the present disclosure, other accompanying drawings may be obtained without creative work for those skilled in the art.

DETAILED DESCRIPTION

Figure 1:
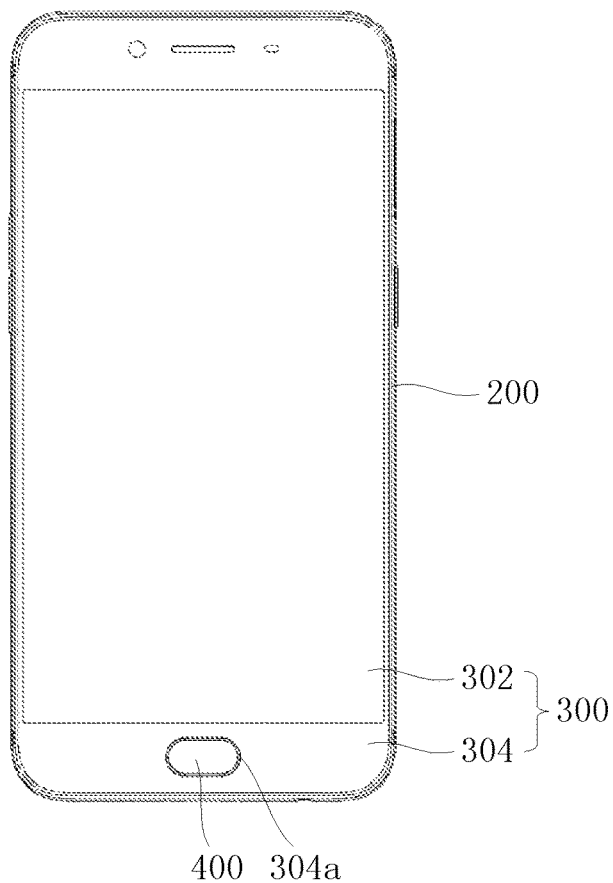
FIG. 1 is a plan view of an electronic apparatus according to an embodiment of the present disclosure.

The following embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the specification of the present disclosure, it is to be understood that terms such as "thickness", "upper", "lower", "front", "rear", "left", "right", "vertical", "horizontal", "top", "bottom", "inner", "outer" and "circumference" refer to the orientations and locational relations illustrated in the drawings, and for describing the present disclosure and for describing in a simple manner, and which are not intended to indicate or imply that the device or the elements are disposed to locate at the specific directions or are structured and performed in the specific directions, which could not to be understood as limiting the present disclosure. In addition, terms such as "first" and "second" are used herein for purposes of description and are not intended to indicate or imply relative importance or significance or to imply the number of indicated technical features. Thus, the feature defined with "first" and "second" may include one or more of such a feature. In the description of the present disclosure, "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the following, an electronic apparatus 100 provided in embodiments of the present disclosure will be described with reference to drawings.

Please referring to FIG. 1, the electronic apparatus 100 may include mobile phone, laptop and tablet computers, etc. It should be understood that "electronic apparatus" in this disclosure can include, but is not limited to, a device that is configured to receive/transmit communication signals via a wireless connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. Examples of the electronic device 100 include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

The electronic apparatus 100 may include a shell assembly 200, a display assembly 300 connected to the shell assembly 200, and a fingerprint module 400 embedded in the display assembly 300.

The shell assembly 200 may define a receiving room (no labeled) to received the display assembly 300 and the fingerprint module 400 therein. The display assembly 300 and the fingerprint module 400 may be assembled as a whole to be embedded in the receiving room. In addition, a chamber (not labeled) may be defined in the shell assembly, to receive some other components such as a battery, a main circuit plate, a camera assembly etc. It should be noted that, in some embodiments, the shell assembly 200 may be made in one piece. While in other embodiments, the shell assembly 200 can also be integrated with different sections. Furthermore, various holes may be defined in the shell assembly such as a key hole, an earphone hole, a USB connection hole, a sound hole, a camera mounting hole, a microphone and the like, in order to make the electronic apparatus 100 be connected with other components. In some embodiments, the shell assembly 200 may be made of metal patterns, such as a logo, may be provided on the outside surface of the shell assembly, which can improve identification and appearance of the electronic apparatus. In some embodiments, an antenna slot (not shown) may be defined in the electronic apparatus 100, and it may be communicated with an antenna component inside the shell assembly 200.

The display assembly 300 may include a display area 302 and a non-display area 304. The display area 302 may be configured to display input information from a user, and output information of the electronic apparatus 100, or various items of the electronic apparatus 100 for facilitating the user to read related information. The non-display area 304 may define a containing slot 304a for containing the fingerprint module 400.

Figure 2:
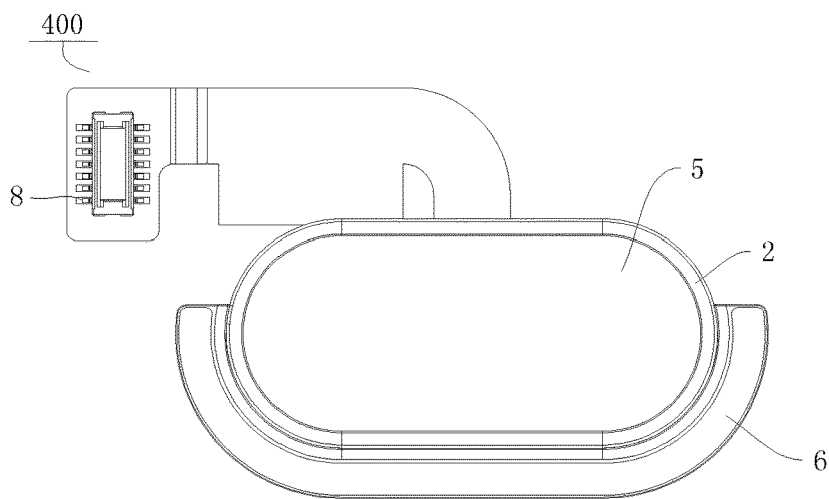
FIG. 2 is a plan view of the fingerprint module according to an embodiment of the present disclosure.
Figure 3:
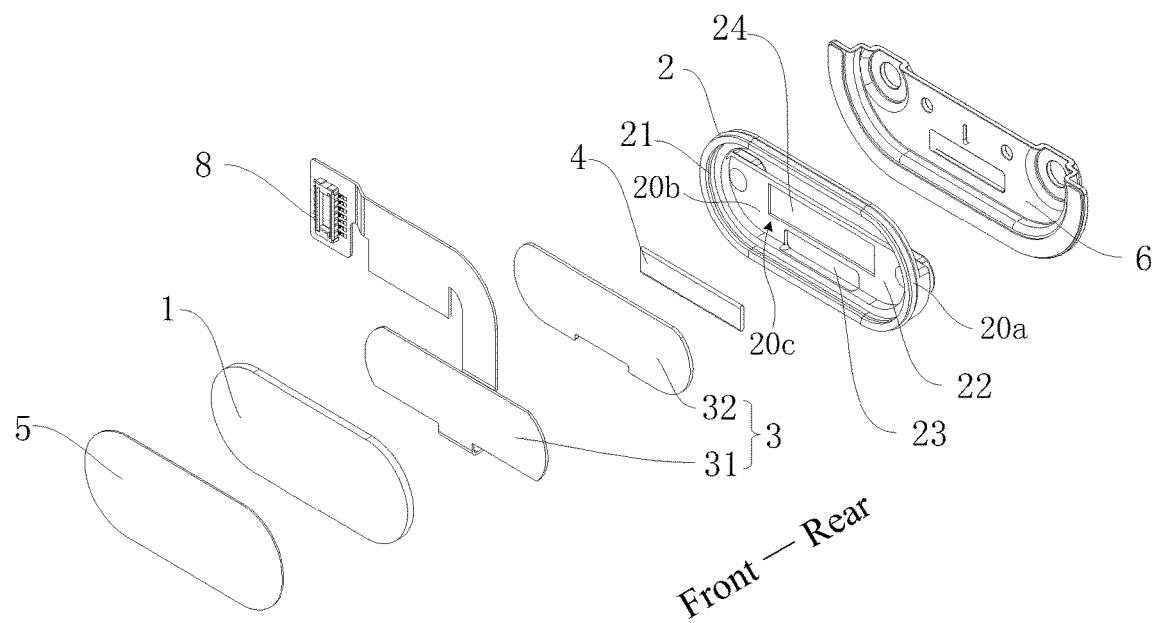
FIG. 3 is an exploded schematic view of the fingerprint module according to an embodiment of the present disclosure.

Referring to the FIG. 2 and FIG. 3, in some embodiments, the fingerprint module 400 may include an encapsulation layer 1 configured to encapsulate a fingerprint identifying assembly 9, a decoration component 2 and a circuit board assembly 3.

Figure 4:
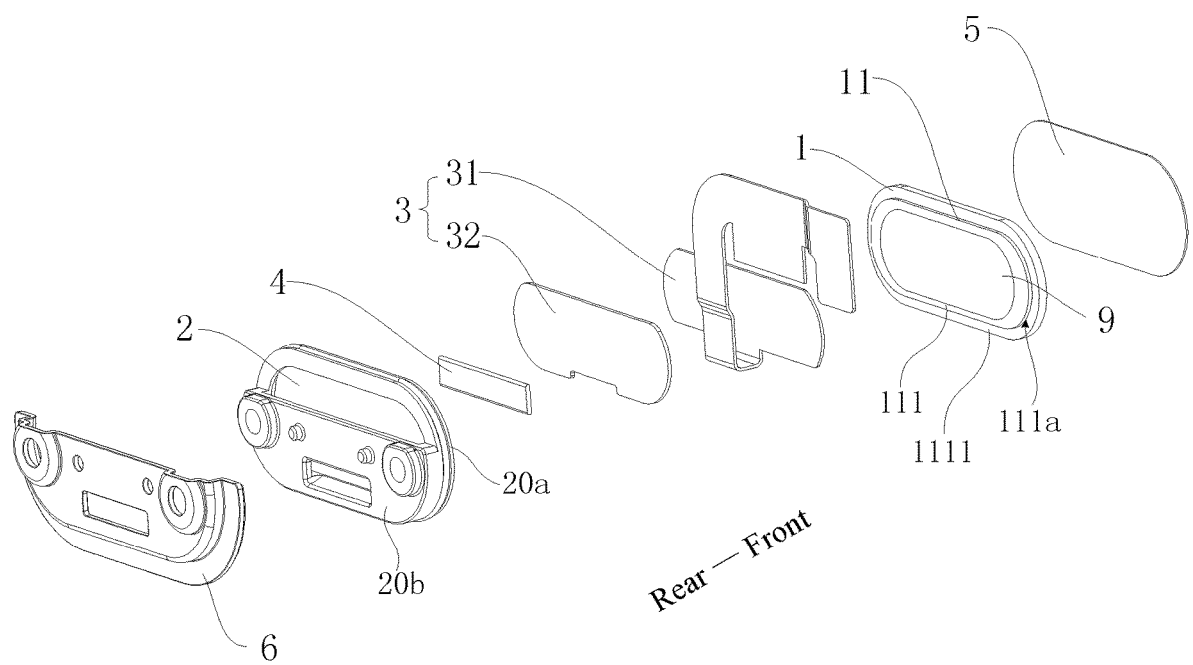
FIG. 4 is another exploded schematic view of the fingerprint module according to the embodiment of the present disclosure.

Referring to FIG. 4, the encapsulation layer 1 may include an end surface 111. An edge region of the end surface 111 may be recessed to form a first step portion 111a.

Figure 5:
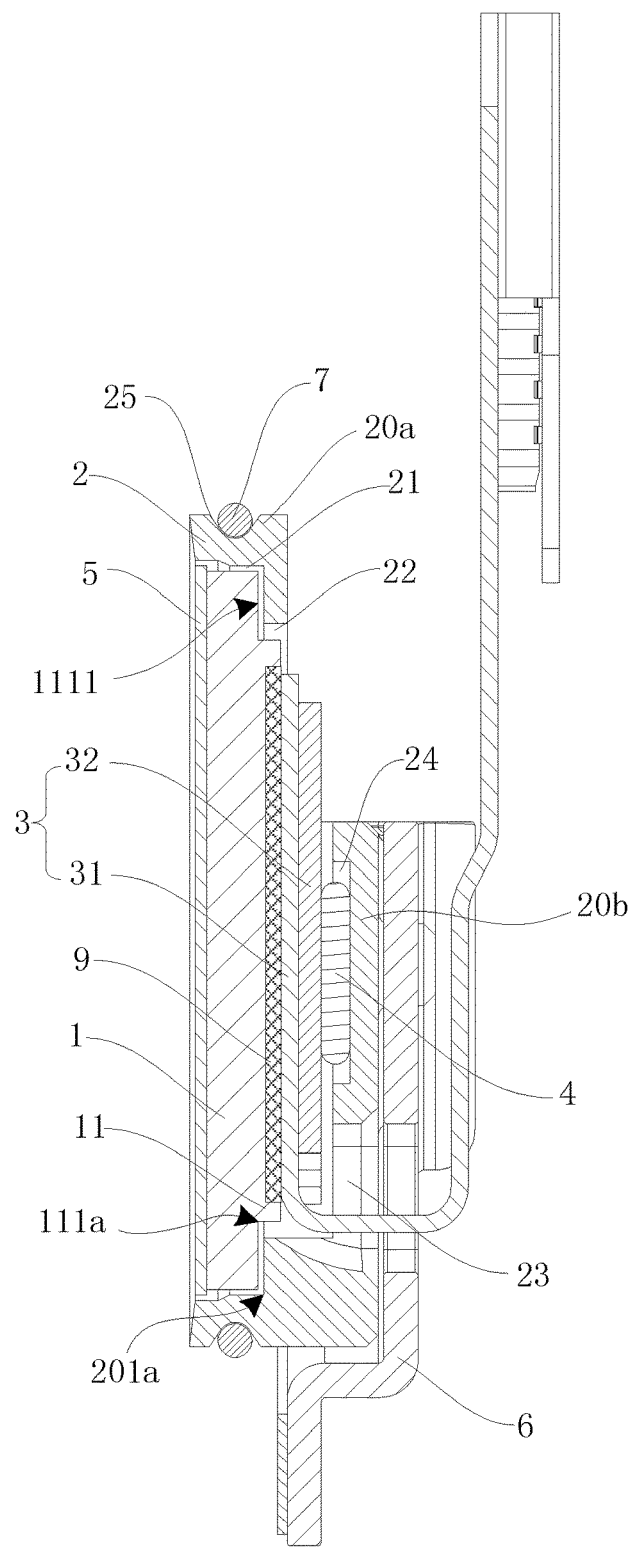
FIG. 5 is a cross-sectional view of the fingerprint module according to the embodiment of the present disclosure.

Referring to FIGS. 3-5, the decoration component 2 may include a sidewall 20a and a bottom wall 20b. The sidewall 20a and the bottom wall 20b may define an embedded cavity 20c, and an inner surface of the sidewall 20a may form a second step portion 20I a.

At least part of the circuit board assembly 3 may be received in the embedded cavity 20c.

Referring to FIGS. 1 and 5, the encapsulation layer 1 may be received in the embedded cavity 20c and the first step portion 111a may match with the second step portion 201a so as to electrically connect the circuit board assembly 3 and the fingerprint identifying assembly 9 7. In some embodiment, the first step portion 111a may be connected to the second step portion 201a by glue.

When the encapsulation layer 1 is embedded in the embedded cavity 20c, the first step portion 111a and the second step portion 201a may match with each other, for example, the first step portion 111a may embedded in the second step portion 201a. The thickness of the encapsulation layer 1 and the decoration component 2 in the front-rear direction can be reduced, such that the thickness of the fingerprint module 400 can be reduced, and the electronic apparatus 100 can be adapted to the ultra-thin design to meet the needs of users.

In some embodiments, referring to FIG. 3, the bottom wall 20b may connect to at least part of the sidewall 20a, that is an area of the bottom wall 20b may be smaller than an area surrounded by the sidewall 20a. A space between the bottom wall 20c and the end surface 111 may be configured to receive the circuit board assembly 3.

In some embodiments, the first step portion 111a may include a first sub-stepped face 1111 facing the embedded cavity 20c. A distance between the end surface 111 and the first sub-stepped face 1111 may be 0.2 mm.

Referring to FIGS. 2-5, in some embodiments, the fingerprint module 400 may include: an encapsulation layer 1 and a decoration component 2 and a fingerprint identifying assembly 9.

Specifically, a rear wall of the encapsulation layer 1 (the rear side as shown in FIG. 5) may have a first mating portion (as the protruding portion 11 described below). The decoration component 2 may define an embedded groove 21. The encapsulation layer 1 may be embedded in the embedded groove 21. The embedded groove 21 may include a second mating portion in the embedded groove 21, and the first mating portion may be embedded in the second mating portion such that the first mating portion and the second mating portion may fit to each other. Therefore, when the encapsulation layer 1 is embedded in the embedded groove 21, since the first mating portion is embedded in the second mating portion, the thickness of the encapsulation layer 1 and the decoration component 2 in the front-rear direction can be reduced, the thickness of the fingerprint module 400 can be reduced. As a result, ultra-thin design of the electronic apparatus can be adapted to meet the user's use requirements.

In some embodiments of the present disclosure, as shown in FIGS. 3-5, the first mating portion may be a protruding portion 11 formed on the rear wall of the encapsulation layer 1 (the rear side as shown in FIG. 5), the second mating portion may be a recess portion 22 formed in the embedded groove 21, and at least a portion of the protruding portion 11 may be disposed in the recess portion 22. Therefore, when the encapsulation layer 1 and the decoration component 2 are assembled, since at least a portion of the protruding portion 11 is embedded in the recess portion 22, the thickness of the encapsulation layer 1 and the decoration component 2 in the front-rear direction can be reduced, the thickness of the fingerprint module 400 can be reduced. As a result, ultra-thin design of the electronic apparatus can be adapted to meet the user's use requirements.

For example, as the embodiment shown in FIGS. 4 and 5, the rear wall of the encapsulation layer 1 has the first mating portion, the first mating portion may be formed as the protruding portion 11. The decoration component 2 may define the embedded groove 21. The encapsulation layer 1 may be disposed in the embedded groove 21. The bottom portion of the embedded groove 21 may be provided with the second mating portion formed as a recess portion 22. The protruding portion 11 may be located in the recess portion 22. The side wall surface of the protruding portion 11 and the rear wall of the encapsulation layer 1 may form a first stepped surface, and the bottom portion of the embedded groove 21 and the side wall of the recess portion 22 may form a second stepped surface, and the first step surface and the second step surface are engaged with each other. Therefore, the displacement of the encapsulation layer 1 relative to the decoration component 2 in the rear direction could be limited, thereby ensuring the reliability of the operation of the fingerprint module 400. When the thickness of the protruding portion 11 in the front-rear direction is a, the overall thickness of the fingerprint module 400 can be reduced by a.

Specifically, as shown in FIG. 4, the number of the protruding portion 11 may be one. Thereby, the structure and processing technology of the encapsulation layer 1 may be simplified, the production cycle may be saved, and the production cost may be reduced. For example, in the embodiment shown in FIG. 4, the rear wall of the encapsulation layer 1 may be provided with the protruding portion 11 which is one and located at the center of the encapsulation layer 1. When the encapsulation layer 1 is processed, the encapsulation layer 1 having the same thickness may be processed first, and then a step is processed in the circumferential direction of the rear wall of the encapsulation layer 1.

In some embodiments of the disclosure, as shown in FIG. 5, an end of the circuit board assembly 3 may pass through the decoration component 2 and extend into the recess portion 22 and be attached to a free end surface of the protruding portion 11 facing the recess portion 22. For example, as the embodiments shown in FIGS. 3-5, the bottom wall 20b of the recess portion 22 may define a through hole 23, the end of the circuit board assembly 3 may extend through the through hole 23 on the decoration component 2 into the recess portion 22, and the end of the circuit board assembly 3 extending into the recess portion 22 may be attached to the free end surface of the protruding portion 11. When the circuit board assembly 3 is attached to the free end surface of the protruding portion 11, on one hand, the protruding portion 11 may protect the circuit board assembly 3 and prevent the impurities in the air from corroding the circuit to cause electrical performance degradation, and on the other hand, the tight connection between a fingerprint identifying assembly 9 in the encapsulation layer 1 and the circuit board assembly 3 can be ensured, and the reliability of the operation of the fingerprint module 400 is ensured.

In other embodiments, a ground terminal 8 may be disposed in the circuit board assembly 3. The decoration component 2 may be a conductive decoration member and be electrically connected to the ground terminal 8 through the circuit board assembly 3. Therefore, the purpose of grounding the decoration component 2 may be achieved by the ground terminal 8, and the static electricity of the decoration component 2 may be prevented from adversely affecting the fingerprint module 400. It should be noted that the static electricity may be generated when the decoration component 2 is touched by objects, or the decoration component 2 is in the friction process, and the generated static electricity has a bad influence on the fingerprint module 400.

Furthermore, as shown in FIGS. 3-5, a conductive component 4 may be sandwiched between the circuit board assembly 3 and the bottom wall 20b of the recess portion 22. Therefore, the electrical connection between the circuit board assembly 3 and the decoration component 2 may be indirectly made, the structural arrangement between the circuit board assembly 3 and the decoration component 2 can be made more reasonable.

Moreover, as shown in FIGS. 3-5, the bottom wall 20b of the recess portion 22 may be provided with a mounting slot 24, the conductive component 4 may be embedded in the mounting slot 24. The mounting slot 24 can limit the conductive component 4 to prevent the conductive component 4 from moving on the bottom wall 20b of the recess portion 22. Thereby, the reliability of the connection between the conductive component 4 and the bottom wall 20b of the recessed portion 22 and between the conductive component 4 and the circuit board assembly 3 can be ensured.

Specifically, the conductive component 4 may be made of conductive foam. The conductive foam may be a conductive cloth wrapped on a flame-retardant sponge. After a series of processes, the conductive foam may have good surface conductivity and can be easily fixed on a device that may require shielding with an adhesive tape. The conductive foam is low in cost, simple in processing, and could ensure the reliability of grounding. When the circuit board assembly 3 is assembled with the decoration component 2, the conductive foam between the circuit board assembly 3 and the decoration component 2 may be compressed to ensure the reliability of connection between the conductive foam and the decoration component 2, thereby ensuring good grounding of the decoration component 2 and preventing the static electricity of the decoration component 2 from adversely affecting the fingerprint module 400.

In some embodiments of the present disclosure, as shown in FIGS. 3 and 5, the circuit board assembly 3 may include: a flexible circuit board 31 and a reinforcing plate 32. An end of the flexible circuit board 31 may extend into the recess portion 22, and attach to the free end surface of the protruding portion 11 (i.e., a surface of the protruding portion 11 facing the bottom wall 20b shown in FIG. 4). On one hand, the protruding portion 11 may protect the flexible circuit board 31, and prevent the impurities in the air from corroding the circuit to cause electrical performance degradation, and on the other hand, the tight connection between the fingerprint identifying assembly 9 in the encapsulation layer 1 and the flexible circuit board 31 may be ensured, and the reliability of the operation of the fingerprint module 400 may be ensured. The grounding terminal 8 may be disposed on the flexible circuit board 31. The reinforcing plate 32 may be attached to the flexible circuit board 31 and electrically connected to the flexible circuit board 31, and the reinforcing plate 32 may be attached to a side of the flexible circuit board 31 away from the encapsulation layer 1 (the rear side as shown in FIG. 5), the conductive component 4 may be electrically connected to the reinforcing plate 32 (i.e., the reinforcing plate 32 is a conductive element). The reinforcing plate 32 may strengthen the structural strength of the flexible circuit board 31 and prevent the flexible circuit board 31 from being bent and damaged; therefore the reliability of the operation of the flexible circuit board 31 may be ensured. At the same time, the decoration component 2 may be connected to the flexible circuit board 31 through the reinforcing plate 32 and the conductive component 4. Therefore, the electrical connection between the decoration component 2 and the grounding terminal through the flexible circuit board 31 may be realized so as to avoid the adverse effect of the static electricity of the decoration component 2 on the fingerprint module 400.

In some embodiments of the present disclosure, as shown in FIG. 5, a circumference of the side wall 20a of the decoration component 2 may be covered with a sealing member 7. When the fingerprint module 400 is mounted on an electronic apparatus 100 such as a mobile phone, the sealing member 7 may prevent the sweat or other liquid on the hand from intruding into the interior of the electronic apparatus 100 and damaging the components in the electronic apparatus 100, thereby ensuring the reliability of the operation of the electronic apparatus 100.

Furthermore, as shown in FIG. 5, the circumference of the side wall 20a of the decoration component 2 may include a sealing groove 25, and the sealing member 7 may be embedded in the sealing groove 25. Therefore, the sealing member 7 may be prevented from being tilted in the axial direction of the decoration component 2 (front-rear direction as shown in FIG. 5) to ensure the reliability of the sealing.

In some embodiments of the present disclosure, as shown in FIGS. 3 and 5, the fingerprint module 400 may further include a cover plate 5, the cover plate 5 may be embedded in the embedded groove 21 and located at a front side of the encapsulation layer 1 (the front side as shown in FIG. 5). On the one hand, the cover plate 5 may further protect the fingerprint identifying assembly 9 and the circuit board assembly 3, and on the other hand, the cover plate 5 may also increase the aesthetics of the fingerprint module 400.

In some embodiments, the cover plate 5 may be a glass cover plate or a ceramic cover plate, the glass cover plate or the ceramic cover plate has high gloss, which can improve the aesthetics of the fingerprint module 400.

The fingerprint module 400 in accordance with one embodiment of the present disclosure is described below with reference to FIGS. 2-5. The following description is merely illustrative and is not intended to limit the disclosure.

As shown in FIGS. 2-5, a fingerprint module 400 according to an embodiment of the present disclosure includes an encapsulation layer 1, a decoration component 2, a circuit board assembly 3, and a cover plate 5.

Specifically, as shown in FIGS. 4 and 5, the encapsulation layer 1 may be configured to encapsulate the fingerprint identifying assembly 9, a first mating portion may be disposed on a rear wall of the encapsulation layer 1, the first mating portion may be a protruding portion 11 formed on the rear wall of the encapsulation layer 1. The number of the protruding portion 11 may be one, and the one protruding portion 11 may be positioned in the middle part of encapsulation layer 1. When the protruding portion 11 is processed, a step may be processed in the circumferential direction of the encapsulating layer 1. The rear wall of the encapsulating layer 1 and the side wall surface of the protruding portion 11 may form a first stepped surface. As shown in FIGS. 3 and 5, the decoration component 2 may have an embedded groove 21, and the encapsulation layer 1 may be disposed in the embedded groove 21. A second mating portion may be formed in the embedded groove 21. In some embodiment, the second mating portion may be a recess portion 22. The protruding portion 11 may be embedded in the recess portion 22. The bottom portion of the embedded groove 21 and the side wall of the recess portion 22 form a second step surface, and the first step surface may be engaged with the second step surface. When the decoration component 2 and the encapsulation layer 1 are assembled, the thickness of the decoration component 2 and the encapsulation layer 1 in the front-rear direction can be reduced, thereby reducing the thickness of the fingerprint module 400, such that ultra-thin requirements of the electronic apparatus 100 could be realized.

It should be noted that when the thickness of the protruding portion 11 in the front-rear direction is a, the overall thickness of the decoration component 2 and the encapsulation layer 1 can be reduced by a. For example, when the thickness of the protruding portion 11 in the front-rear direction is 0.2 mm, the thickness of the decoration component 2 after being assembled with the encapsulating layer 1 can be reduced by 0.2 mm in the front-rear direction.

As shown in FIGS. 3-5, the circuit board assembly 3 may include a flexible circuit board 31 and a reinforcing plate 32. The bottom wall 20b of the recess portion 22 of the decoration component 2 may be provided with a through hole 23. An end of the flexible circuit board 31 may pass through the through hole 23 into the recess portion 22, extend into the end of the flexible circuit board 31 in the recess portion 22 and be attached to the free end surface of the protruding portion 11 (i.e., the rear end surface of the protruding portion 11). On one hand, the encapsulation layer 1 can protect the flexible circuit board 31, prevent the impurities in the air from corroding the flexible circuit board 31 to cause electrical performance degradation, and on the other hand, the tight connection between the fingerprint identifying assembly 9 in the encapsulation layer 1 and the flexible circuit board 31 may be ensured, and the reliability of the operation of the fingerprint module 400 may be ensured. The reinforcing plate 32 may be a reinforcing steel plate, and the reinforcing plate 32 may be attached to the side of the flexible circuit board 31 away from the encapsulation layer 1 and electrically connected to the flexible circuit board 31, that is, the reinforcing plate 32 may be attached to the rear side wall of the flexible circuit board 31. The reinforcing plate 32 can strengthen the structural strength of the flexible circuit board 31 and prevent the flexible circuit board 31 from being bent and damaged.

In addition, as shown in FIGS. 2-4, the decoration component 2 may be a conductive metal piece, and the other end of the flexible circuit board 31 (the end that does not extend into the recess portion 22) is provided with a ground terminal 8. The conductive component 4 may be disposed between the reinforcing plate 32 and the bottom wall 20b of the recess portion 22. The decoration component 2 may be electrically connected to the grounding terminal through the conductive component 4, the reinforcing plate 32 and the flexible circuit board 31. Therefore, the purpose of grounding the decoration component 2 may be achieved, and the static electricity of the decoration component 2 may be prevented from adversely affecting the fingerprint module 400. The conductive component 4 may be made of conductive foam, and the cross section of the conductive foam is rectangular. The bottom wall 20b of the recess portion 22 may be provided with a mounting slot 24 having a rectangular cross section, and the conductive foam may be embedded in the mounting slot 24. Therefore, the conductive foam can be prevented from moving, thereby ensuring the reliability of the electrical connection between the decoration component 2 and the flexible circuit board 31.

As shown in FIG. 5, the cover plate 5 may be a glass cover plate which is disposed in the embedded groove 21 and located on the front side of the encapsulation layer 1, and the cover plate 5 may block the front side opening of the embedded groove 21. The cover plate 5 could not only protect the circuit board assembly 3, but also increase the aesthetics of the fingerprint module 400.

As shown in FIG. 5, the circumference of the side wall 20a of the decoration component 2 may be sleeved with the sealing member 7 embedded in the sealing groove 25 on the circumference of the side wall 20a of the decoration component 2. When the fingerprint module 400 is mounted on an electronic apparatus 100 such as a mobile phone, it could prevent the sweat or other liquid on the hand from intruding into the interior of the electronic apparatus 100 and damaging the components inside the electronic apparatus 100, thereby ensuring the reliability of the operation of the electronic apparatus 100.

As shown in FIGS. 3-5, the fingerprint module 400 may further include a fingerprint pressing plate 6, and the fingerprint pressing plate 6 may be disposed on the rear side of the decoration component 2.

In the process of manufacturing the fingerprint module 400, the cover plate 5, the encapsulation layer 1, the flexible circuit board 31 and the reinforcing plate 32 may be processed together, and then the conductive foam may be pasted into the mounting slot 24 of the decoration component 2. The cover plate 5, the encapsulation layer 1, the flexible circuit board 31 and the reinforcing plate 32 which are processed together may be assembled together by the surrounding dispensing glue and assembled with the decoration component 2 then held in pressure. At the same time, through the gluing assembly, after the glue is pressed for a period of time, the glue may be solidified to ensure good grounding between the reinforcing plate 32 and the decoration component 2 through the certain amount of compression of the conductive foam between the reinforcing plate 32 and the decoration component 2.

The fingerprint module 400 according to the embodiment of the present disclosure forms a protruding portion 11 by processing a step on the rear wall of the encapsulation layer 1. Since the protruding portion 11 and the recess portion 22 of the decoration component 2 are fixed by glue, the thickness in the front-rear direction of the assembly of the encapsulating layer 1 and the decoration component 2 could be reduced. As a result, the thickness of the fingerprint module 400 could be reduced.

In the description of the present disclosure, "one embodiment", "partial embodiment", "conceptual embodiment", "illustration", "specific illustration" or "partial illustration" and the like as referential expressions represent specific features, structures, materials or characteristics described in the embodiment or the illustration, meaning that they are at least included in one embodiment or illustration of the present invention. In the present specification, these expressions do not always represent the same embodiment or illustration. The specific features, structures, materials or characteristics described may be combined in an appropriate form in any one or a plurality of embodiments or illustrations.

That is the description of the present invention, and those skilled in the art may change, alter, replace and modify the above-stated embodiments variously in the range without departing from the principle and the technical idea of the present invention. The scope of the present invention is defined by the appended claims and any and all equivalents thereof.

What is claimed is:

1. A fingerprint module, comprising:
   an encapsulation layer, configured to encapsulate a fingerprint identifying assembly; wherein the encapsulation layer comprises a plate-shaped portion having a rear wall, and a protruding portion located at the center of the rear wall, and an edge region of the rear wall is recessed relative to the protruding portion, such that a thickness of the protruding portion is larger than a thickness of the edge region; and
   a decoration component, defining an embedded groove and a recess portion in the embedded groove;
   wherein the fingerprint identifying assembly is embedded in the embedded groove; the plate-shaped portion covers the embedded groove, and the protruding portion is embedded in the embedded groove and attached to one side of the fingerprint identifying assembly, and the protruding portion is embedded to the recess portion.

2. The fingerprint module of claim 1, wherein a number of the protruding portion is one.

3. The fingerprint module of claim 2, further comprising a circuit board assembly, wherein an end of the circuit board assembly passes through the decoration component and extends into the recess portion; and the end of the circuit board assembly is attached to a free end surface of the protruding portion facing the recess portion, such that the circuit board assembly is electrically connected to the fingerprint identifying assembly.

4. The fingerprint module of claim 3, wherein a through hole is defined in the decoration component, the end of the circuit board assembly passes through the through hole and extends into the recess portion.

5. The fingerprint module of claim 3, wherein a ground terminal is disposed on the circuit board assembly, the decoration component is a conductive decoration member, and the decoration component is electrically connected to the ground terminal through the circuit board assembly.

6. The fingerprint module of claim 5, wherein a conductive component is sandwiched between the circuit board assembly and a bottom wall of the recess portion to electrically connect the decoration component and the circuit board assembly.

7. The fingerprint module of claim 6, wherein the bottom wall of the recess portion defines a mounting slot, and the conductive component is embedded in the mounting slot.

8. The fingerprint module of claim 6, wherein the conductive component is made of conductive foam.

9. The fingerprint module of claim 6, wherein the circuit board assembly comprises:
   a flexible circuit board, an end of the flexible circuit board extending into the recess portion, the end of the flexible circuit board being attached to the free end surface of the protruding portion, wherein the ground terminal is disposed on the flexible circuit board; and
   a reinforcing plate, attached to a side of the flexible circuit board away from the encapsulation layer and electrically connected to the flexible circuit board, wherein the conductive component is electrically connected to the reinforcing plate.

10. The fingerprint module of claim 6, further comprising a fingerprint pressing plate, wherein the fingerprint pressing plate is fixed on a rear side of the decoration component.

11. A fingerprint module, comprising:
    an encapsulation layer configured to encapsulate a fingerprint identifying assembly, wherein the encapsulation layer comprises a plate-shaped portion having an end surface, and a protruding portion located at the center of the end surface, and an edge region of the end surface is recessed relative to the protruding portion, such that a thickness of the protruding portion is larger than a thickness of the edge region to form a first step portion;
    a decoration component, comprising a sidewall and a bottom wall, wherein the sidewall and the bottom wall defines an embedded cavity, an inner surface of the sidewall close to the embedded cavity forms a second step portion; and
    a circuit board assembly, at least part of the circuit board assembly being received in the embedded cavity;
    wherein the fingerprint identifying assembly is embedded in the embedded cavity; the plate-shaped portion covers the embedded cavity, the protruding portion is received in the embedded cavity and attached to one side of the fingerprint identifying assembly; and the first step portion matches with the second step portion, such that the circuit board assembly is electrically connected to the other side of the fingerprint identifying assembly.

12. The fingerprint module of claim 11, wherein the bottom wall is connected to at least part of the sidewall, a space between the bottom wall and the end surface is configured to receive the circuit board assembly.

13. The fingerprint module of claim 11, wherein the circuit board assembly comprises:
    a flexible circuit board, an end of the flexible circuit board extending into the embedded cavity, the end of the flexible circuit board being attached to the end surface of the encapsulation layer; and
    a reinforcing plate, attached to a side of the flexible circuit board away from the encapsulation layer and electrically connected to the flexible circuit board.

14. The fingerprint module of claim 11, wherein the first step portion is connected to the second step portion by glue.

15. An electronic apparatus, comprising:
    a shell assembly;
    a display assembly, connected to the shell assembly; and
    a fingerprint module, embedded in the display assembly and comprising:
    a finger identifying assembly;

an encapsulation layer configured to encapsulated the finger identifying assembly, wherein the encapsulation layer comprises a plate-shaped portion having an end surface, and a protruding portion located at the center of the end surface, and an edge region of the end surface is recessed relative to the protruding portion, such that a thickness of the protruding portion is larger than a thickness of the edge region to form a first step portion;

a decoration component, comprising a sidewall and a bottom wall, wherein the sidewall and the bottom wall defines an embedded cavity, a side of the sidewall near the embedded cavity forms a second step portion; and a circuit board assembly, at least part of the circuit board assembly being received in the embedded cavity;

wherein the fingerprint identifying assembly is embedded in the embedded cavity; the plate-shaped portion covers the embedded cavity, and the protruding portion is received in the embedded cavity and attached to one side of the fingerprint identifying assembly; and the first step portion matches with the second step portion, such that the circuit board assembly is electrically connected to the other side of the fingerprint identifying assembly.

16. The electronic apparatus of claim 15, wherein the bottom wall is connected to at least part of the sidewall, a space between the bottom wall and the end surface is configured to receive the circuit board assembly.

17. The electronic apparatus of claim 15, wherein the first step portion is connected to the second step portion by glue.

18. The electronic apparatus of claim 17, wherein an end of the circuit board assembly passes through the decoration component and extends into the embedded cavity; the end of the circuit board assembly is attached to the end surface of the encapsulation layer, such that the circuit board assembly is electrically connected to the fingerprint identifying assembly.

19. The electronic apparatus of claim 18, wherein the circuit board assembly comprises:

a flexible circuit board, an end of the flexible circuit board extending into the embedded cavity, the end of the flexible circuit board being attached to the end surface of the encapsulation layer; and a reinforcing plate, attached to a side of the flexible circuit board away from the encapsulation layer and electrically connected to the flexible circuit board.

* * * * *